United States Patent
Miyamoto

(10) Patent No.: US 7,246,646 B2
(45) Date of Patent: Jul. 24, 2007

(54) METHOD FOR PRODUCTION AND APPARATUS FOR PRODUCTION OF ADHESIVE WAFER

(75) Inventor: Akihiro Miyamoto, Nagano (JP)

(73) Assignee: Shinko Electric Industries Co., Ltd., Nagano (JP)

( * ) Notice: Subject to any disclaimer, the term of this patent is extended or adjusted under 35 U.S.C. 154(b) by 17 days.

(21) Appl. No.: 10/847,373

(22) Filed: May 18, 2004

(65) Prior Publication Data

US 2004/0238118 A1    Dec. 2, 2004

(30) Foreign Application Priority Data

May 26, 2003    (JP)    ............................. 2003-147110

(51) Int. Cl.
*B32B 37/00*    (2006.01)
(52) U.S. Cl. .................. 156/540; 156/543; 156/582
(58) Field of Classification Search ............... 156/230, 156/234, 238, 247, 249, 538, 539, 540, 541, 156/542, 556, 543, 582
See application file for complete search history.

(56) References Cited

U.S. PATENT DOCUMENTS

| | | | |
|---|---|---|---|
| 5,106,450 A | * | 4/1992 | Freisitzer et al. ........... 156/517 |
| 5,472,554 A | * | 12/1995 | Ko et al. .................... 156/361 |
| 6,715,524 B2 | * | 4/2004 | Chen et al. ................. 156/540 |

* cited by examiner

*Primary Examiner*—James Sells
(74) *Attorney, Agent, or Firm*—Staas & Halsey LLP

(57) ABSTRACT

A process for production and apparatus for production of an adhesive wafer which produce a wafer with an adhesive coated well over the entire back surface using a die attach film, wherein the wafer is placed on a table having substantially the same planar shape as the planar shape of the wafer and the entire back surface is heated, the die attach film is pressed against the back surface, and the separation film is peeled off from the wafer in the state with the adhesive heated through the wafer.

4 Claims, 5 Drawing Sheets

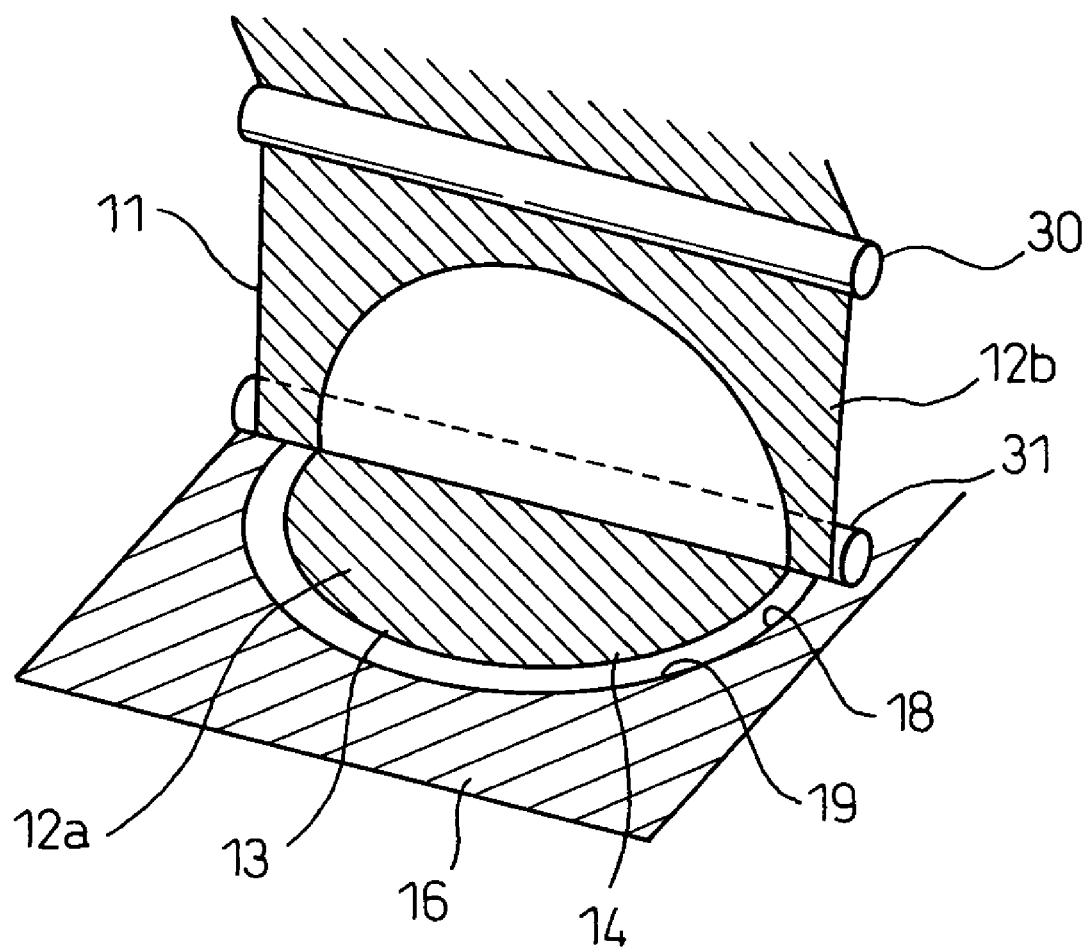

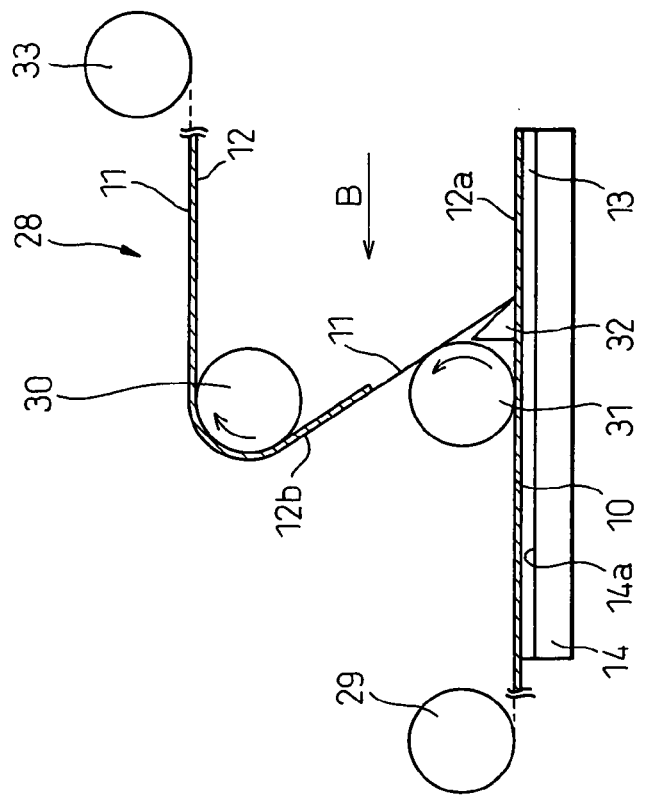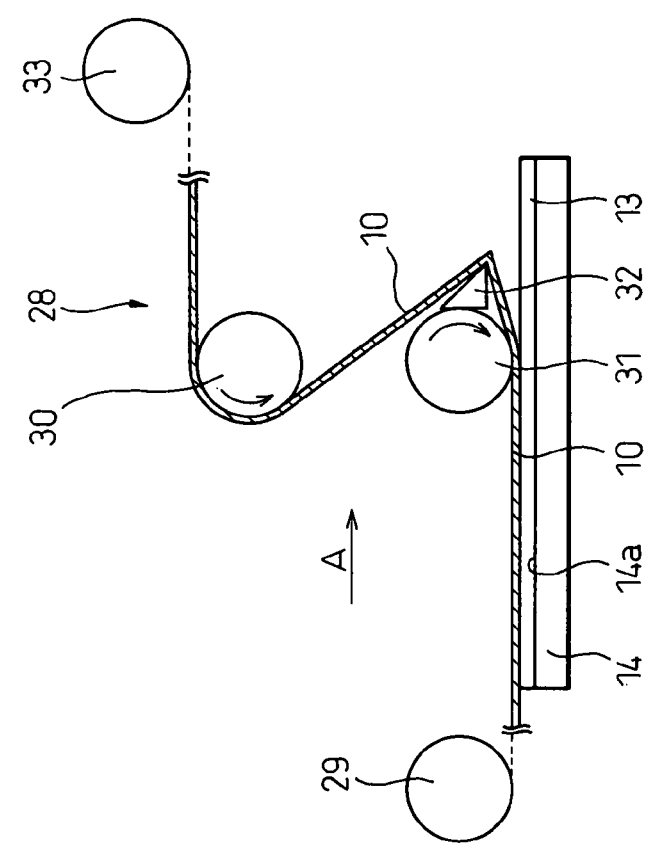

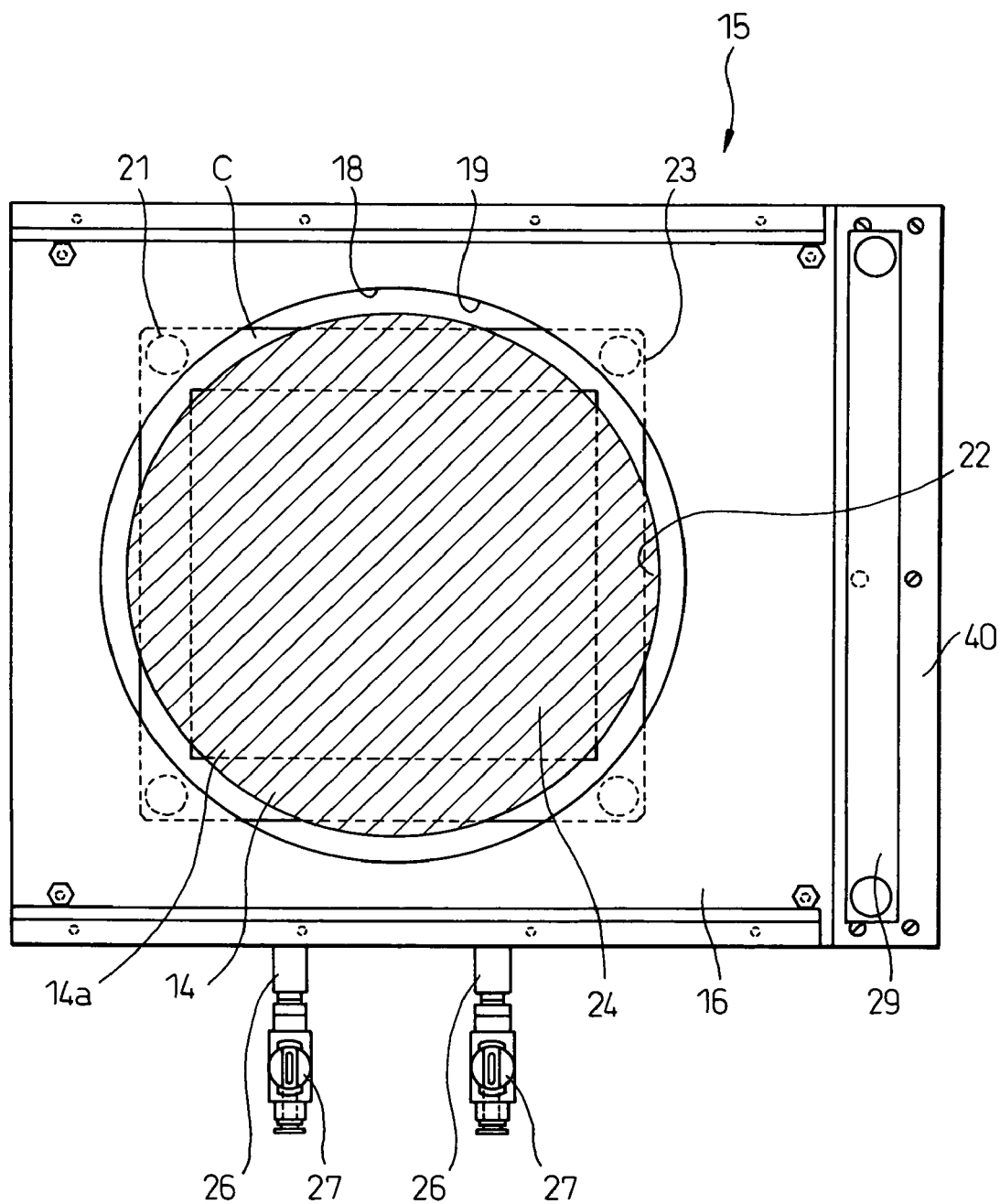

METHOD FOR PRODUCTION AND APPARATUS FOR PRODUCTION OF ADHESIVE WAFER

BACKGROUND OF THE INVENTION

1. Field of the Invention

The present invention relates to a method for production and apparatus for production of an adhesive wafer which use a die attach film to transfer an adhesive for die bonding to the back surface of a wafer at the time of production of semiconductor devices.

2. Description of the Related Art

When die bonding semiconductor chips to substrates, lead frames, etc., the practice has been to coat the back surface of the wafer with an adhesive at the stage of the semiconductor wafer, dice the wafer, then die bond the individual semiconductor chips to the substrates or lead frames by the adhesive. One of the methods conventionally used for coating the back surface of a wafer by an adhesive is the method of attaching a die attach film to the back surface of the wafer and transferring the adhesive from the die attach film to the wafer. As shown in FIG. 6, a die attach film 10 is comprised of a long separation film 11 and an adhesive 12 formed in a layer on one surface of the separation film 11 and generally is provided in a form wound up in a roll.

The conventional method for coating the back surface of a wafer with an adhesive using a die attach film was to attach the die attach film 10 on the back surface of the wafer, move a cutter along the outer circumference of the wafer to cut the die attach film to match with the outer shape of the wafer, then peel off the separation film and reheat to cure the adhesive. Note that another method consisted of attaching a die attach film cut to the outer shape of a wafer in advance on to the back surface of the wafer and transferring the adhesive from the die attach film to the wafer.

Summarizing the problems to be solved by the invention, with the method of moving a cutter to cut the die attach film along the outer circumference of the wafer, the wafer was liable to end up being cut along with the die attach film or the wafer to end up being scratched. In particular, recent wafers are being formed thinner along with the reduction in size of semiconductor chips, so scratches or fractures occur more easily due to cutters. Further, the adhesive is being required to be coated over the entire back surface of the wafer without protruding from the wafer and without any uncoated parts. Accordingly, with the method of using a die attach film cut to the outer shape of the wafer in advance, it is necessary to position the wafer and die attach film with a high precision. The process and apparatus therefore end up becoming complicated.

SUMMARY OF THE INVENTION

An object of the present invention is to provide a method for production and apparatus for production of an adhesive wafer enabling production of an adhesive wafer coated well over the entire back surface with an adhesive using a die attach film and without using any complicated apparatus or process.

To attain the above object, according to a first aspect of the invention, there is provided a method for production of an adhesive wafer by hot pressing a die attach film comprised of a separation film on one surface of which an adhesive is provided to a back surface of a wafer and peeling off the separation film from the wafer to thereby transfer the adhesive to the entire back surface of the wafer, comprising the steps of placing the wafer on a table having substantially the same planar shape as the planar shape of the wafer and heated by a heating unit, thereby heating the entire back surface of the wafer; pressing the die attach film over the back surface of the wafer in a state with the wafer supported by the table to heat and soften only the adhesive of the part in contact with the wafer through the wafer; and peeling the separation film from the wafer in the state with the wafer supported on the table and the adhesive heated through the wafer so as to peel off the softened adhesive from the separation film and leave it on the wafer and make the adhesive at other than the wafer region separate while stuck to the separation film.

According to a second aspect of the invention, there is provided an apparatus for production of an adhesive wafer by hot pressing a die attach film comprised of a separation film on one surface of which an adhesive is provided to a back surface of a wafer and peeling off the separation film from the wafer to thereby transfer the adhesive to the entire back surface of the wafer, comprising a table having substantially the same planar shape as the planar shape of the wafer, provided to be able to be heated by a heating unit, and provided to be able to carry and fix the wafer; a feed roller provided to be able to feed out a long die attach film, a recovery roller for taking up the die attach film fed out from the feed roller, a pressing roller provided between the recovery roller and the feed roller to be able to move reciprocatively in a parallel direction with the table relative to the table and hot pressing the die attach film held by predetermined tension to a wafer carried on and fixed to the heated table, and a guide roller arranged above the pressing roller, guiding the die attach film between the pressing roller and recovery roller, and provided so as to work together with the pressing roller to be able to move reciprocatively in a parallel direction to the table relative to the table, wherein when the pressing roller and guide roller move to the recovery roller side relative to the table, the pressing roller presses and hot presses the die attach film on the wafer heated on the table, then, in the state where the adhesive adhering to the wafer is heated and softened through the wafer, when the pressing roller and guide roller move to the feed roller side relative to the table, the guide roller pulls the die attach film hot pressed to the wafer to peel off the softened adhesive from the separation film and leave it on the wafer and to make the adhesive of other than the wafer region stick to the separation film and peel off the separation film from the wafer.

Further, the table is fixed to the main body of the apparatus through a heat insulating collar, and a clearance is formed with the main body of the apparatus. Further, the separation film peeled off from the wafer is bent at an acute angle by a peeling blade.

BRIEF DESCRIPTION OF THE DRAWINGS

These and other objects and features of the present invention will become clearer from the following description of the preferred embodiments given with reference to the attached drawings, wherein:

FIG. 1 is a perspective view of the state of a die attach film being peeled off from a wafer;

FIGS. 2A and 2B are cross-sectional views for explaining the operation of a hot pressing step and peeling step by a film conveyance unit;

FIGS. 3A, 3B, and 3C are a plan view, front view, and side view of a wafer fixing unit.

DESCRIPTION OF THE PREFERRED EMBODIMENTS

Figure 4:
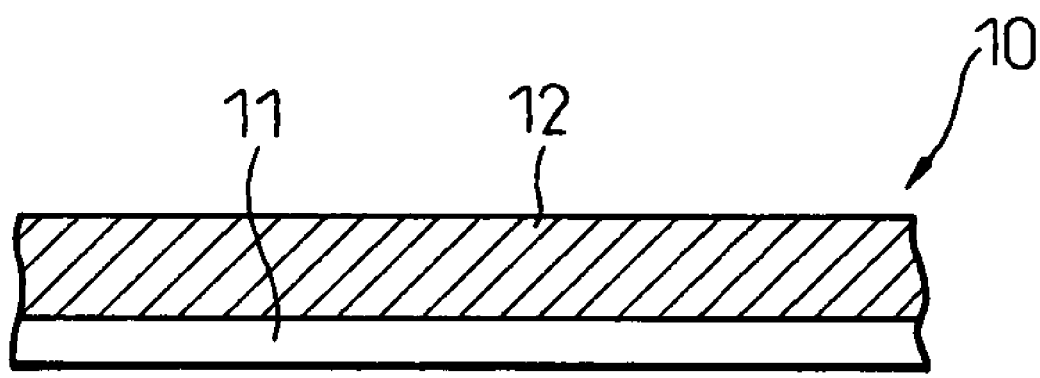
FIG. 4 is a cross-sectional view for explaining the configuration of a die attach film.

Preferred embodiments of the present invention will be described in detail below while referring to the attached figures. As shown in FIG. 4, a die attach film 10 is comprised of a separation film 11 and an adhesive 12 provided in a layer form at one surface of the separation film 11 and is provided in the form of a long film wound up in a roll. The die attach film used is one which is formed wider than the diameter of the wafer and can cover the entire back surface of the wafer. The separation film 11 is comprised of polyethylene terephthalate (PET) or another film, while the adhesive 12 uses a heat curing resin as its base binder. Further, the die attach film 10 sometimes has attached to it a cover film comprised of a polyethylene film etc. at the front surface where the adhesive 12 is coated so as to protect the adhesive 12. On the other hand, the wafer is made of silicon and is formed in a thin disk shape. It is provided as an adhesive wafer at the back surface of which an adhesive is coated as opposed to the front surface where the semiconductor circuits are formed.

Figure 3B:
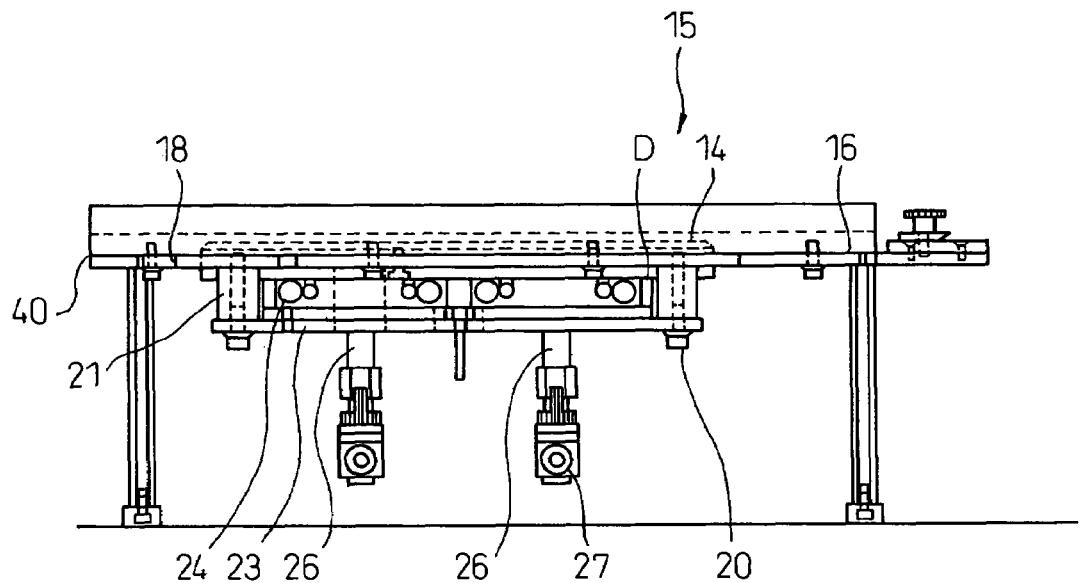

Next, an apparatus for production of an adhesive wafer will be explained with reference to FIGS. 3A, 3B, and 3C. The apparatus for production of an adhesive wafer is comprised of a wafer fixing unit 15 for fixing in place and heating a water and a film transport unit 28 for transporting and pressing the die attach film and peeling off the separation film. FIG. 3A is a plan view of the wafer fixing unit 15, FIG. 3B is a front view, and FIG. 3C is a side view.

The wafer fixing unit 15 has a main body 40 of the apparatus comprised of a flat top 16 and four legs 17 and is formed in a table shape. Further, as shown in FIG. 3A, the flat top 16 is provided at its approximate center with a table positioning hole 18 passing through it. The table positioning hole 18 is provided inside it with a disk shaped table with a clearance C from its edges 19.

Figure 3C:
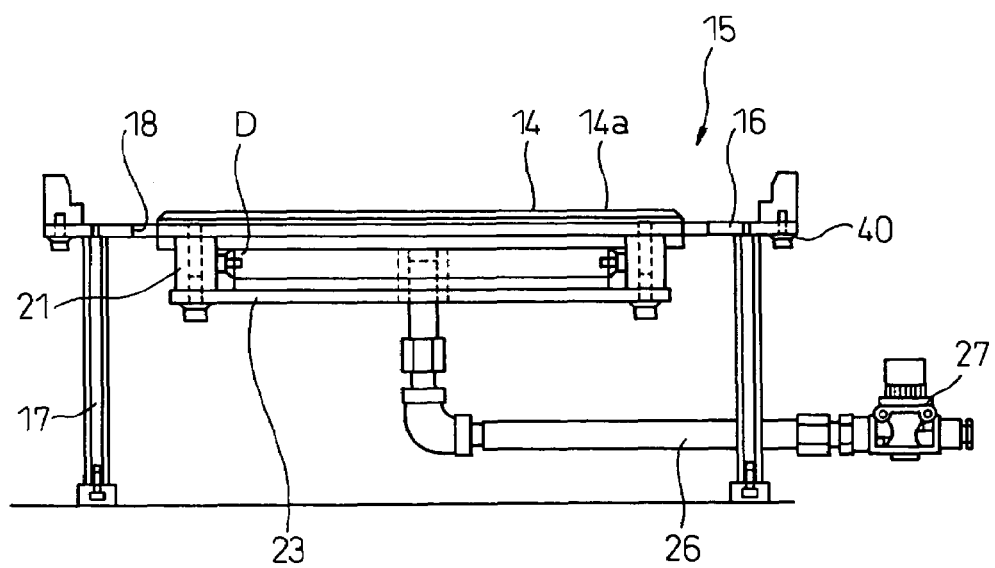

The top surface 14a of the table 14 has a planar shape substantially the same as the planar shape of the wafer 13 and is arranged somewhat above the top surface of the flat top 16 (see FIG. 3C). Therefore, the die attach film only contacts the wafer 13 and is never attached to other parts. Below the flat top 16, a support plate 23 of a square planar shape is fixed to the bottom surface of the flat top 16 at its four corners by a heat insulating collar 21 and screws 20. The heater 24 is placed on and fixed to the support plate 23.

The table 14 is placed on and fixed to the top of the part of the heater 24 exposed upward through the table positioning hole 18. The heater 24 is provided so as to uniformly heat the entire top surface 14a of the table 14.

Further, the wafer fixing part 15 is provided with a suction clamp for holding by suction the wafer 13 on the top surface 14a of the table 14. The suction clamp is provided so as to reliably hold by suction the entire surface of the wafer 13, in particular the outer circumference, firmly on the table 14. Reference numeral 26 is a pipe of the suction clamp communicated with the top surface 14a of the table 14 and connected to a vacuum generator. The middle of it is provided with a valve 27 able to switch on/off the suction clamping operation of the wafer.

Next, the film transport unit 28 will be explained. FIG. 1 is an explanatory view of the state of the die attach film being peeled off from the wafer. FIG. 2A is a cross-sectional view for explaining the operation of the hot pressing step of the film transport unit, while FIG. 2B is a cross-sectional view for explaining the operation of the separation film peeling step of the film transport unit. Reference numeral 29 is a feed roller at which the die attach film 10 is wound In a roll able to be fed out and arranged at the side of the flat top as shown in FIG. 3. As shown in FIG. 2A, at the film transport unit 28, the die attach film 10 fed out from the feed roller 29 first passes under the pressing roller 31, is strung over the peeling blade 32 and guide roller 30 in that order, and finally is taken up by the recovery roller 33. The pressing roller 31, guide roller 30, and peeling blade 32 are arranged above the wafer fixing unit 15. Further, the die attach film 10 transported by the film transport unit 28 in this way is arranged with the adhesive 12 at the table 14 side and with the separation film 11 toward the top.

Further, the recovery roller 33 and the feed roller 29 are provided with brakes for braking the rotation. When the brakes are not actuated, both rollers freely rotate. When the brakes are actuated, the feed roller 29 stops the feedout of the die attach film, while the recovery roller 33 stops the takeup and feedout of the die attach film. When the rotations of the two rollers are stopped by the brakes in this way, the die attach film 10 between the two is held in a state with a predetermined tension applied. Further, the recovery roller 33 is connected to a drive unit so as to be driven to rotate.

The pressing roller 31 is an elastic roller with an outer circumferential surface comprised of rubber etc. and is provided so as to sandwich the die attach film 10 and wafer 13 with the table 13 and press them by a predetermined pressing force. The peeling blade 32 is provided at the side of the recovery roller 33 side of the pressing roller 31, while the guide roller 30 is provided above the pressing roller 31. Further, the pressing roller 31, guide roller 30, and peeling blade are provided so as to be able to move reciprocatively in the left-right direction (arrow A and B directions of FIGS. 2A and 2B) parallel to the top surface of the table while maintaining their positional relationship.

Further, when hot pressing the die attach film to the wafer as shown in FIG. 2A, the pressing roller 31, guide roller 30, and peeling blade 32 move together in the arrow A direction (from feed roller side to recovery roller side). That is, along with the pressing roller 31 moving so as to press the die attach film 10 against the entire surface of the wafer fixed on the table 14, the guide roller 30 and peeling blade also move. At this time, the peeling blade 32 is positioned above away from the wafer 13 at the pressing roller 31 side so as not to interfere with the pressing action by the pressing roller 31.

Further, as shown in FIG. 2B, when peeling the separation film 11 from the wafer 13, the pressing roller 31, guide roller 30, and peeling blade 32 all move in the arrow B direction (from recovery roller side to feed roller side). At this time, the peeling blade 32 is positioned below close to the die attach film 10 adhered to the wafer 13. Further, the separation film 11 adhered to the wafer 13 together with the adhesive 12 is guided by the peeling blade 32 and bent at an acute angle whereby it separates from the wafer 13. In this way, the peeling blade 32 is provided to be able to move reciprocatively in the arrow A and B directions together with the pressing roller 31. When moving in the arrow A direction (hot pressing step), it is fixed to an upper position at the side of the pressing roller, while when moving in the arrow B direction (peeling step of separation film), it is fixed at a lower position close to the die attach film 10 on the wafer 13 at the side of the pressing roller 31.

Next, the method for production of an adhesive wafer by the apparatus for production of the above configuration will be explained with reference to the case of using as the die attach film a cover film of the "semiconductor die bonding (Hi-Attach) DF series made by Hitachi Chemical Co., Ltd. (conditions for later curing: temperature 180°C., time 30 to 300 sec)". First, in preparation for the hot bonding step, the pressing roller 31, guide roller 30, and peeling blade 32 are arranged at positions away from the top of the table 14 at the feed roller 29 side. By driving the recovery roller 33 to rotate, the die attach film 10 for attachment to the wafer 13 is fed out from the feed roller 29 with the recovery roller 33. The feedout die attach film 10 is given a predetermined tension between the feed roller 29 and the recovery roller 33 by braking the two, passes below the pressing roller, and is strung between the guide roller and the peeling blade roller 32. Further, the peeling blade is fixed in place to stand by at an upper position at the pressing roller side.

Further, the wafer 13 is placed on the top surface of the table 14 with its back surface facing up, fixed in place by the suction clamp, and heated by the heating unit through the table 14. At this time, the wafer 13 is carried aligned with the top surface 14*a* so as not to stick out. Further, the entire back surface of the wafer 13 is heated by the top surface 14*a*. At this time, the wafer 13 is heated so as to become a high temperature of an extent where the adhesive contacting the wafer is not cured. For example, when using the above DF series, the adhesive pressed against the wafer should be heated to 100 to 160° C. When the wafer 13 is heated to a predetermined temperature, the rotation of the pressing roller, peeling blade, and guide roller cause the die attach film 10 to be pressed against the entire surface of the wafer. In the case of the above DF series of die attach films, the film should be pressed by the pressing roller 31 at a pressure of 0.1 to 3 MPa for a time of 0.5 to 10 sec.

Due to this, the adhesive 12 of the die attach film is heated and softened through the heated wafer and rises in bondability. Since the die attach film 10 is pressed in this state, it is adhered to the wafer 13. At this time, the planar shape of the top surface 14*a* of the table heated by the heating unit matches with the planar shape of the wafer 13. The wafer 13 is carried without sticking out from the top surface 14*a* and the entire back surface is heated. Further, the table 14 is provided so as to prevent heat of the heating unit being transmitted to the area around the top surface 14*a* by the provision of the clearance A and the heat insulating collar 21. Due to this, the die attach film is heated only at the adhesive of the part in contact with the wafer by the hot pressing step and the adhesive of that part is raised in bondability. Further, the adhesive at that time is heated to a high temperature of an extent not curing and sufficiently softened.

The pressing roller 31 presses the die attach film 10 across the entire surface of the wafer 13. When moving to the recovery roller 33 side, the peeling blade 32 is refixed at a lower position close to the die attach film 10 on the wafer 13. Further, in the state where the wafer 13 is held at a predetermined heating temperature of the hot pressing step, the pressing roller, guide roller, and peeling roller are made to move in the direction of the arrow B for the work of peeling off the separation film 11. Due to this movement, the separation film 11, stretched between the feed roller and recovery roller by a predetermined tension is pulled in a direction peeling it from the wafer 13 by the guide roller 30. Further, at the time of peeling, the peeling blade 32 is guided so that the separation film 11 stretched by the guide roller is bent at an acute angle. The peeling work ends when the peeling blade 32 moves to a position away from the top surface of the wafer 13. Next, the brakes of the feed roller and recovery roller are released, the recovery roller 33 is driven to rotate so as to take up the used die attach film by the recovery roller 33, and the die attach film 10 is fed out from the feed roller 29 for use for the succeeding wafer.

The adhesive adhered over the entire back surface of the wafer in the hot pressing step is heated to soften and be raised in bondability, but the adhesive other than at the wafer region is not heated, so remains in a low bondability state. If the separation film is peeled off from the wafer in this state, the adhesive can be easily torn and separated at the boundary due to the difference in the heating and softening states. Further, if the separation film 11 is peeled off from the wafer 13 (see FIG. 1 and FIG. 2B), the adhesive 12*a* softened and raised in bondability automatically remains fixed to the wafer, and the adhesive 12*b* at the outer part other than the wafer region remains on the separation film and is recovered by the recovery roller together with the separation film. Due to this, it is possible to produce an adhesive wafer comprised of a wafer to the entire back surface of which an adhesive is transferred. Further, the adhesive is coated matching the planar shape of the heated wafer, so it is possible to produce a good adhesive wafer with no protrusion of adhesive or uncoated parts.

Further, by the provision of the clearance C and heat insulating collar, the heat due to the heating unit is not transmitted to the surroundings from the top surface of the table, so the surroundings are not dirtied by adhesion of the adhesive. Further, since there is no cutting by a cutter in the production process, the wafer will not be scratched. Further, according to the above configuration, at the time of peeling, the pressing roller moves while pressing the die attach film again, so it is possible to reliably coat the adhesive on the wafer. Further, the used separation film after peeling can be recovered in a long (i.e., an original elongated) state by the recovery roller, so management and disposal become easy. In addition, the unused parts of the adhesive remain coated on the separation film, so disposal of the unused parts becomes simple.

Further, the hot pressing step and separation film peeling step of the die attach film may be performed consecutively in the same apparatus, so the efficiency is good and the apparatus and process are not complicated. In this way, according to the present invention, it is possible to efficiently produce an adhesive wafer by a simple apparatus and method. Further, the adhesive wafer is then diced, washed, dried, and die bonded to form semiconductor devices.

Above, various preferred embodiments of the present invention were explained, but the invention is not limited to these embodiments. Numerous modifications may be made of course within the scope of the spirit of the invention. The die attach film may also be used when forming stacked CSPs comprised of chips stacked in multiple layers. When the die attach film is provided with a cover film, the cover film is peeled off from the adhesive before the die attach film is superposed over the wafer.

Above, the case where a brake was arranged between the feed roller and the recovery roller was explained, but the invention is not limited to this. It is sufficient that the die attach film be strung with a predetermined tension in the hot pressing step and peeling step. Further, an apparatus where the pressing roller, peeling roller, and guide roller moved reciprocatively with respect to a fixed table was explained, but the apparatus may also be configured so that the pressing roller etc. are fixed and the table moves.

Summarizing the effects of the invention, it is possible to efficiently produce an adhesive wafer comprising a wafer over the entire back surface of which an adhesive is coated well using a die attach film and without using any complicated apparatus or process.

While the invention has been described with reference to specific embodiments chosen for purpose of illustration, it should be apparent that numerous modifications could be made thereto by those skilled in the art without departing from the basic concept and scope of the invention.

What is claimed is:

1. An apparatus for production of an adhesive wafer by hot pressing a die attach film comprising a separation film on one surface of which an adhesive is provided, to an entire back surface of a wafer having a planar shape and peeling off the separation film from the wafer to thereby transfer the adhesive to the entire back surface of the wafer, comprising:
    a table having substantially the same planar shape as the planar shape of said wafer, provided to be able to be heated by a heating unit, and able to carry and fix said wafer,
    a feed roller feeding out a die attach film,
    a recovery roller taking up die attach film fed out from said feed roller;
    a pressing roller, provided between said recovery roller and said feed roller and movable reciprocatively in a parallel direction with said table, relative to said table, hot pressing said die attach film held by predetermined tension to a wafer carried on and fixed to said heated table; and
    a guide roller arranged above said pressing roller, guiding said die attach film between said pressing roller and recovery roller, and working together with said pressing roller to move reciprocatively in a parallel direction to said table, relative to said table, wherein:
        when said pressing roller and guide roller move to the recovery roller side, relative to said table, said pressing roller presses and hot presses said die attach film on the wafer heated on said table,
        in the state where the adhesive adhering to the wafer is heated and softened through the wafer, when the pressing roller and guide roller move to the feed roller side relative to said table, said guide roller pulls the die attach film, hot pressed to the wafer, to peel off the softened adhesive from the separation film and leave it on the wafer and to make the adhesive, of regions other than the wafer region, remain stuck to the separation film and peel off with the separation film from the wafer, and
        said table is fixed to a main body of said apparatus through a heat insulating collar and a clearance is formed with said main body of said apparatus.

2. An apparatus for production of an adhesive wafer as set forth in claim 1, wherein the separation film, as peeled off from the wafer, is bent at an acute angle by a peeling blade.

3. An apparatus for production of an adhesive wafer as set forth in claim 1, wherein the separation film, as peeled off from the wafer, is bent at an acute angle by a peeling blade.

4. An apparatus for production of an adhesive wafer comprising:
    a table heated by a heating unit, the table further including wafer carrying and fixing means;
    a wafer fixed by the table, the wafer having substantially the same planar shape as a planar shape of the table;
    a feed roller feeding out a die attach film;
    a recovery roller taking up the die attach film fed out from the feed roller;
    a pressing roller movable reciprocally in a parallel direction with the table, the pressing roller being provided between the recovery roller and the feed roller and hot pressing the die attach film to the wafer carried on and fixed to the table; and
    a guide roller arranged above the pressing roller, guiding the die attach film between the pressing roller and recovery roller, and working together with the pressing roller to move reciprocally in a parallel direction to the table, relative to the table,
    wherein
        when the pressing roller and guide roller move to the recovery roller side, relative to the table, the pressing roller presses and hot presses the die attach film on the wafer heated on the table,
        in the state where the adhesive adhering to the wafer is heated and softened through the wafer, when the pressing roller and guide roller move to the feed roller side relative to the table, the guide roller pulls the die attach film, hot pressed to the wafer, to peel off the softened adhesive from the separation film and leave it on the wafer and to make the adhesive, of regions other than the wafer region, remain stuck to the separation film and peel off with the separation film from the wafer, and
        the table is fixed to the main body of the apparatus through a heat insulating collar and a clearance is formed with the main body of the apparatus.

* * * * *

UNITED STATES PATENT AND TRADEMARK OFFICE
CERTIFICATE OF CORRECTION

PATENT NO.       : 7,246,646 B2                                          Page 1 of 1
APPLICATION NO.  : 10/847373
DATED            : July 24, 2007
INVENTOR(S)      : Akihiro Miyamoto It is certified that error appears in the above-identified patent and that said Letters Patent is hereby corrected as shown below:

Column 4, Line 4, change "In" to --in--.

Column 5, Line 10, change "feedout" to --fedout--.

Column 5, Line 60, change "tension" to --tension,--.

Signed and Sealed this

Sixth Day of November, 2007

JON W. DUDAS
*Director of the United States Patent and Trademark Office*